(12) United States Patent
Anderson et al.

(10) Patent No.: US 12,449,042 B2
(45) Date of Patent: Oct. 21, 2025

(54) VALVE SEAT RETENTION

(71) Applicant: Bray International, Inc., Houston, TX (US)

(72) Inventors: Mitchell Anderson, Katy, TX (US); Ananda Prasath, Chennai (IN); Jaisuman Velayutham, Ponneri (IN); Prakash Karthikeyan, Chennai (IN); Prabhakaran Adikesavan, Kanchipuram (IN)

(73) Assignee: Bray International, Inc., Houston, TX (US)

( * ) Notice: Subject to any disclaimer, the term of this patent is extended or adjusted under 35 U.S.C. 154(b) by 10 days.

(21) Appl. No.: 18/607,895

(22) Filed: Mar. 18, 2024

(65) Prior Publication Data
US 2024/0318729 A1 Sep. 26, 2024

Related U.S. Application Data

(60) Provisional application No. 63/491,131, filed on Mar. 20, 2023.

(51) Int. Cl.
F16K 1/42 (2006.01)
F16K 1/22 (2006.01)

(52) U.S. Cl.
CPC ............... F16K 1/427 (2013.01); F16K 1/22 (2013.01)

(58) Field of Classification Search
CPC ......... F16K 1/2266; F16K 1/226; F16K 1/427
See application file for complete search history.

(56) References Cited

U.S. PATENT DOCUMENTS

| 3,144,040 A | * | 8/1964 | White | F16K 1/226 251/307 |
| 3,726,504 A | * | 4/1973 | Kormos | F16K 1/226 251/306 |
| 4,513,765 A | | 4/1985 | Rishovd et al. | |

(Continued)

FOREIGN PATENT DOCUMENTS

| CN | 208237099 U | 12/2018 |
| EP | 0122691 A1 | 10/1984 |

(Continued)

OTHER PUBLICATIONS

Lanel, Francois, International Search Report for PCT App. No. PCT/US2024/020368, Aug. 14, 2024, 6 pages, European Patent Office, Rijswijk, The Netherlands.

(Continued)

*Primary Examiner* — Kevin F Murphy
(74) *Attorney, Agent, or Firm* — Oathout Law Firm; Mark A. Oathout; Laura Tu

(57) ABSTRACT

The disclosure relates to a retention arrangement for a seat in a valve body, wherein the seat has a first seat side and a second seat side, including: a seat spacer wherein the seat spacer has a first seat spacer side and a second seat spacer side, wherein the seat spacer is adjacent to the seat; a fastener inserted into the second seat spacer side, wherein the fastener includes a head above the second seat spacer side, and further wherein the head is movable towards and away from the second seat spacer side; and a seat retainer adjacent to the head of the fastener, wherein the seat retainer has a first seat retainer side and a second seat retainer side.

13 Claims, 9 Drawing Sheets

(56) References Cited

U.S. PATENT DOCUMENTS

| | | | | |
|---|---|---|---|---|
| 4,593,916 | A | * | 6/1986 | Laulhe .................. F16K 5/0673 |
| | | | | 277/637 |
| 5,695,170 | A | | 12/1997 | Dernovsek et al. |
| 9,038,664 | B2 | * | 5/2015 | McCarty .................. F16K 1/42 |
| | | | | 137/625.37 |

FOREIGN PATENT DOCUMENTS

| | | | |
|---|---|---|---|
| KR | 200188899 | Y1 | 7/2000 |
| WO | 2011038346 | A2 | 3/2011 |
| WO | 2011143598 | A2 | 11/2011 |

OTHER PUBLICATIONS

Lanel, Francois, Written Opinion of the International Searching Authority for PCT App. No. PCT/US2024/020368, Aug. 14, 2024, 9 pages, European Patent Office, Rijswijk, The Netherlands.

Bray International, Inc., TRI LOK Triple Offset Valve: Installation, Operation and Maintenance Manual, Jun. 28, 2021, 24 pages, Bray International, Inc., Houston, Texas, United States.

Emerson Electric Co., Vanessa Series 30,000 Triple Offset Valves for Cryogenic Applications, Jan. 1, 2017, 16 pages, Emerson Electric Co., St. Louis, Missouri, United States.

Orton Srl, Triple Eccentric Metal Seated Valves: MV "royal" cryogenic, Nov. 28, 2005, 10 pages, Orton Srl, Italy.

Velan S.A.S., Cryogenic Metal Seated Butterfly Valves, Mar. 5, 2009, 8 pages, Velan S.A.S., France.

OMB Group Company, Fluicon Valves: Triple Offset Metal Seated Process Valves for Severe Service, Mar. 26, 2015, 20 pages, OMB Group Company, Italy.

* cited by examiner

VALVE SEAT RETENTION

BACKGROUND

Technical Field

The disclosure relates to seating or sealing arrangements for metal seated butterfly valves. Metal seated butterfly valves are used in a wide variety of industries, including oil & gas, petroleum, petrochemical, chemical, power generation, pulp & paper, and mining among many others. Butterfly valves fall under a family of valves called quarter-turn valves. These valves are used to stop, regulate, or start the flow of medium or fluid in the pipeline. There are several types of butterfly valves, one among which is triple offset butterfly valves. A triple offset valve's unique geometry makes it non-rubbing, metal-to-metal sealing system delivers zero leakage with a minimal amount of torque required for operation. Metal seated triple offset butterfly valves are suitable for operations in light vacuum to high-pressure applications and ideally suited for applications requiring absolute zero leakage.

Most conventional triple offset valves are manufactured with an integral seat, thus a small amount of wear or damage to the seat can result in the valve having to be removed and sent to a repair facility or manufacturing plant for additional seat material to be added, followed by re-machining the integral seat and its hardened surface. This results in significant delays and costs, even lost production. Further, conventional butterfly valve seating arrangements which do not feature an integral seat often have a great number of fasteners which can often get misplaced during a busy operation, and may fall out on accident. Conventional butterfly valve seating arrangements without an integral seat may also use set screws or screws with jam nuts, which cannot be adjusted independently to properly compress the seat gasket, and requires the use and removal of additional components.

Therefore a need exists for an improved seat retention arrangement in metal seated butterfly valves capable of independent replacement of the seat and seal ring, which allows the seat, seal ring, and other components to be replaced with minimal delay in startup and minimal downtime; wherein the improved seat retention arrangement prevents the possibility of any fasteners on the seat retention arrangement from falling out; and further wherein the improved seat retention arrangement has the ability to independently adjust to properly compress the seat gasket, with no need to remove additional components.

SUMMARY

The disclosure relates to a retention arrangement for a seat in a valve body, wherein the seat has a first seat side and a second seat side, including: a seat spacer wherein the seat spacer has a first seat spacer side and a second seat spacer side, wherein the seat spacer is adjacent to the seat; a fastener inserted into the second seat spacer side, wherein the fastener includes a head above the second seat spacer side, and further wherein the head is movable towards and away from the second seat spacer side; and a seat retainer adjacent to the head of the fastener, wherein the seat retainer has a first seat retainer side and a second seat retainer side.

BRIEF DESCRIPTION OF THE DRAWINGS

The exemplary embodiments may be better understood, and numerous objects, features, and advantages made apparent to those skilled in the art by referencing the accompanying drawings. These drawings are used to illustrate only exemplary embodiments, and are not to be considered limiting of its scope, for the disclosure may admit to other equally effective exemplary embodiments. The figures are not necessarily to scale and certain features and certain views of the figures may be shown exaggerated in scale or in schematic in the interest of clarity and conciseness.

DESCRIPTION OF EMBODIMENT(S)

The description that follows includes exemplary apparatus, methods, techniques, and instruction sequences that embody techniques of the inventive subject matter. However, it is understood that the described embodiments may be practiced without these specific details.

Figure 1:
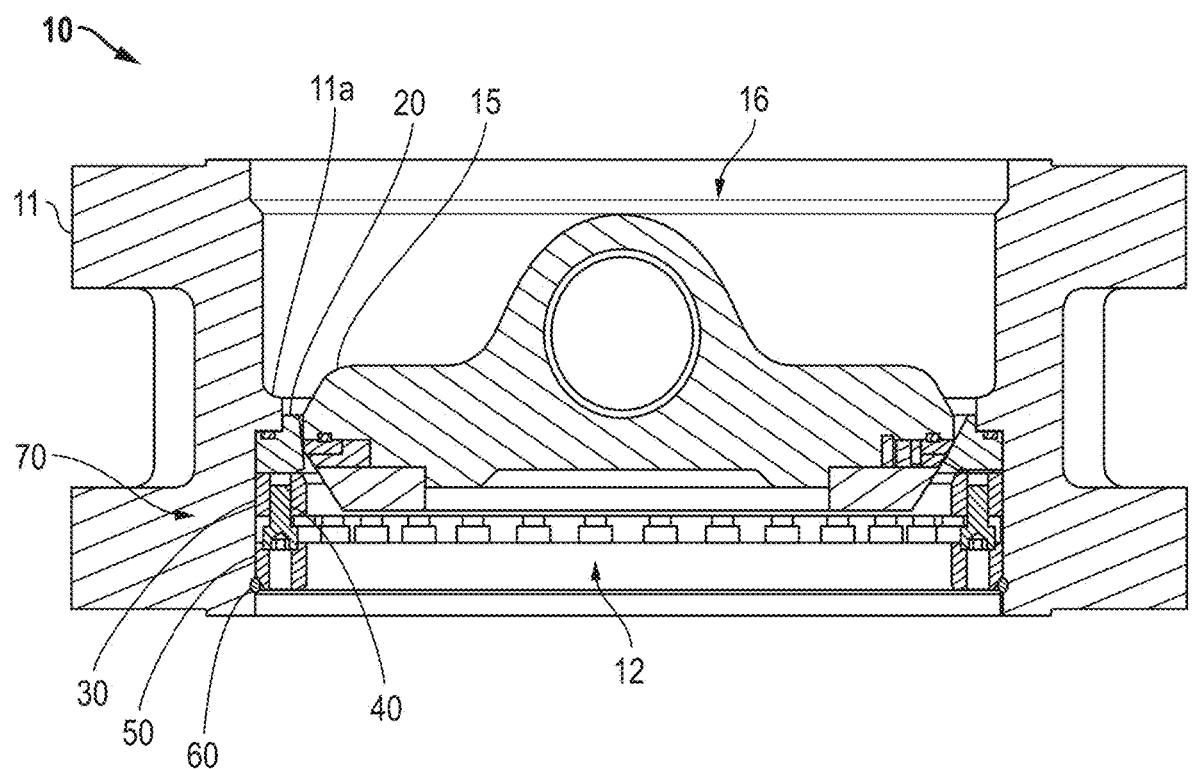
FIG. 1 depicts a horizontal midplane cross-sectional view of an exemplary embodiment of a butterfly valve with an assembled improved retention arrangement for a seat, wherein the butterfly valve is in a fully closed position.
Figure 2:
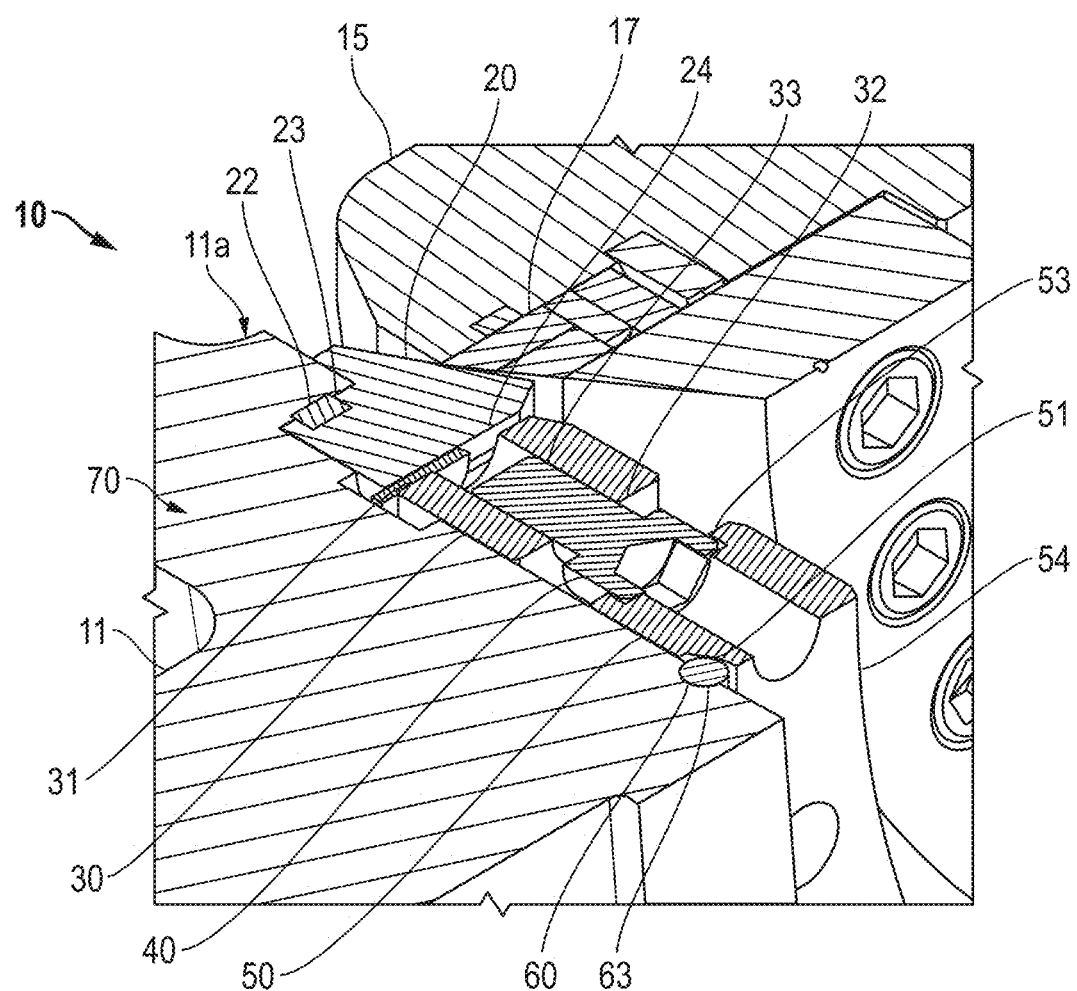
FIG. 2 depicts an enlarged partial cross-sectional isometric view of an exemplary embodiment of a butterfly valve and the assembled improved seat retention arrangement.
Figure 3:
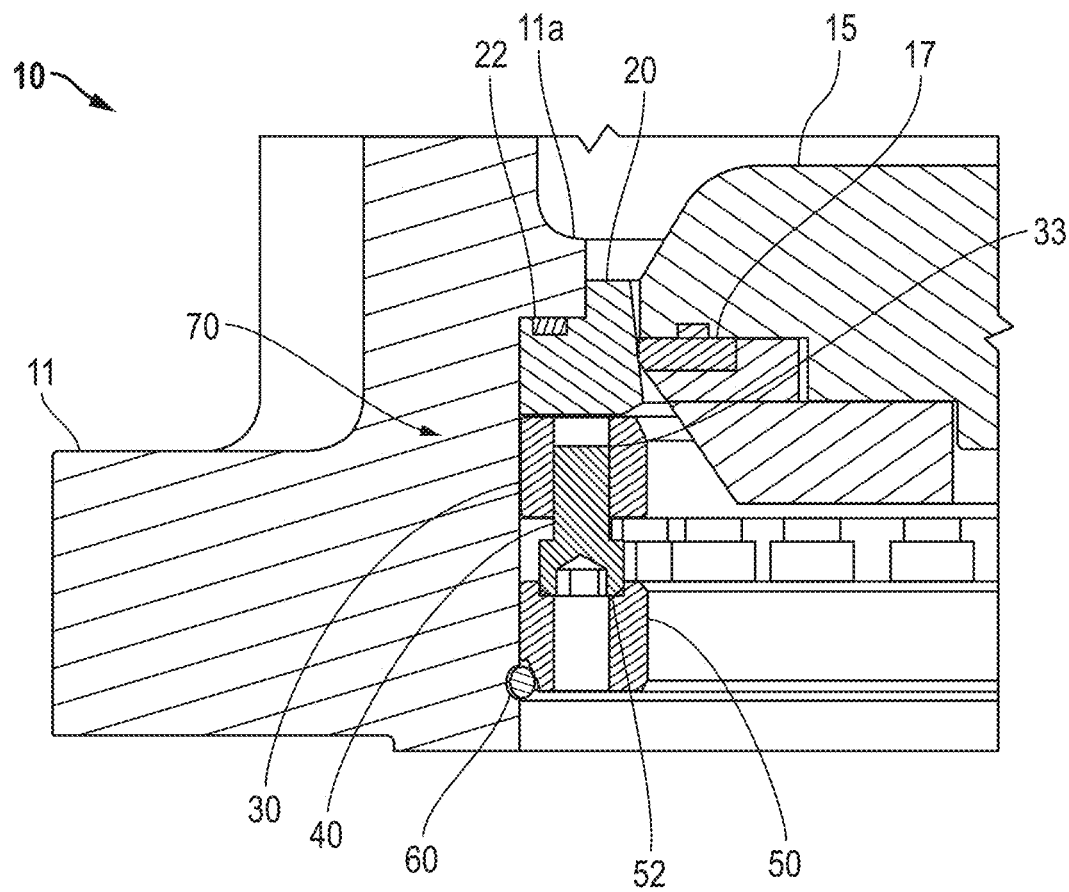
FIG. 3 depicts an enlarged partial cross-sectional view of an exemplary embodiment of the butterfly valve with the assembled improved seat retention arrangement as shown in FIG. 1.
Figure 4:
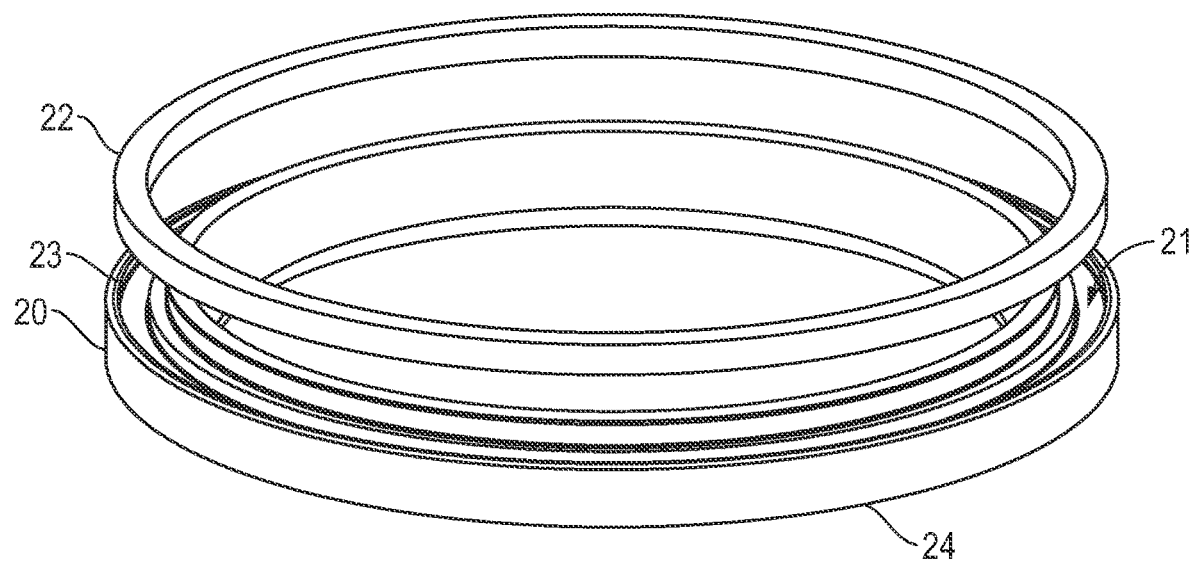
FIG. 4 depicts an isometric view of exemplary embodiments of a seat and a seat gasket for an improved seat retention arrangement.

FIG. 1 depicts a horizontal midplane cross-sectional view of an exemplary embodiment of a butterfly valve 10 with an assembled improved retention arrangement, system, or apparatus 70 for a seat 20, wherein the butterfly valve 10 is in a fully closed position 16. FIGS. 2-3 depict an enlarged cross-sectional views of the exemplary embodiment of the butterfly valve 10 having the assembled improved seat retention arrangement 70 for a seat 20. The butterfly valve 10 includes at least: a valve body 11 defining a valve opening, through-bore, or hatch 12 through which a fluid may flow; a control element or disc 15 which is configured to be rotatable within the valve opening 12 between a fully closed position 16, which blocks or prevents fluid flow through the valve opening 12, and various open, including partially open, positions which allow fluid through the valve opening 12; and an improved seat retention arrangement 70 configured to engage the disc sealing ring 17 of the disc 15 and prevent fluid leakage when the butterfly valve 10 is in a fully closed position 16. The disc 15 may have a substantially circular circumference or outer surface about which a removable disc sealing ring or seal 17 may be inserted. The removable disc sealing ring or seal 17 contacts the seat 20 when the valve 10 is in the closed position 16.

The improved seat retention arrangement 70 for the seat 20 includes at least the seat spacer 30, the screws, fasteners, or cap screws 40, the seat retainer 50, and the seat retaining ring 60. The valve opening or through-bore 12 may have a substantially circular circumference defined on the interior surface of the valve body 11 (see e.g., at least FIG. 5). The components of the seat retention arrangement 70 for the seat 20 are inserted within the valve opening 12, adjacent to and along the circular circumference of the valve opening 12; accordingly, each of the seat 20, the seat gasket 22, the seat spacer 30, the seat retainer 50, and the seat retaining ring 60 may have a substantially annular, ringed, or ring-like shape with each having a first surface and a second surface connected by an interior surface and an exterior surface, wherein the interior surface of each is facing, nearer or adjacent to the through-bore 12, and wherein the exterior surface of each is facing, nearer or adjacent to the valve body 11.

The sealing in the butterfly valve 10 happens between the seat 20 and the seal 17 engage, i.e. when the butterfly valve 10 is in the closed position 16. The seat 20 is one of the most important elements of a butterfly valve 10. Improper retention of the seat 20 will lead to fluid leakage of the valve 10, resulting in loss of the process fluid. In the improved seat retention arrangement 70, the seat 20 is retained in the valve body 11 via the seat spacer 30, the cap screws 40, the seat retainer 50, and the seat retaining ring 60. Further, while the exemplary embodiments depict a triple offset butterfly valve 10, it is to be appreciated that any metal seated valves 10, including non-triple offset butterfly valves 10 and valves which are not butterfly valves, are encompassed by the present disclosure.

Referring to the FIGS. 1-4, a first surface or side 23 of the seat 20 of the annular or ring-shaped seat 20 is installed on within the valve body opening 12, against an interior surface of the valve body 11. In certain exemplary embodiments, as depicted, the seat 20 may be installed against or adjacent to a shoulder or extension 11*a* of the valve body opening 12. The seat 20 may further define a seat groove, depression, or trench 21 within the first side or surface 23 of the seat 20. A seat gasket 22 is inserted into this seat groove 21 and is located or rests between the valve body 11 and the first surface 23 of the seat 20 in the assembled improved seat retention arrangement 70. A thin film of lubricant is applied on the surface of the seat gasket 22 which is adjacent to or abutting the valve body 11. The seat 20 further defines a second surface or side 24 of the seat 20, located across from the first side 23 of the seat 20.

FIGS. 1-3 show exemplary embodiments of a fully assembled improved seat retention arrangement 70 for the seat 20. The FIGS. 5, 7-11 show partially assembled exemplary embodiments of the improved seat retention arrangement 70; in particular the FIGS. 5, 7, 8, and 10 show the progressive assembling or installation of the improved seat retention arrangement 70 into the valve body 11.

Figure 5:
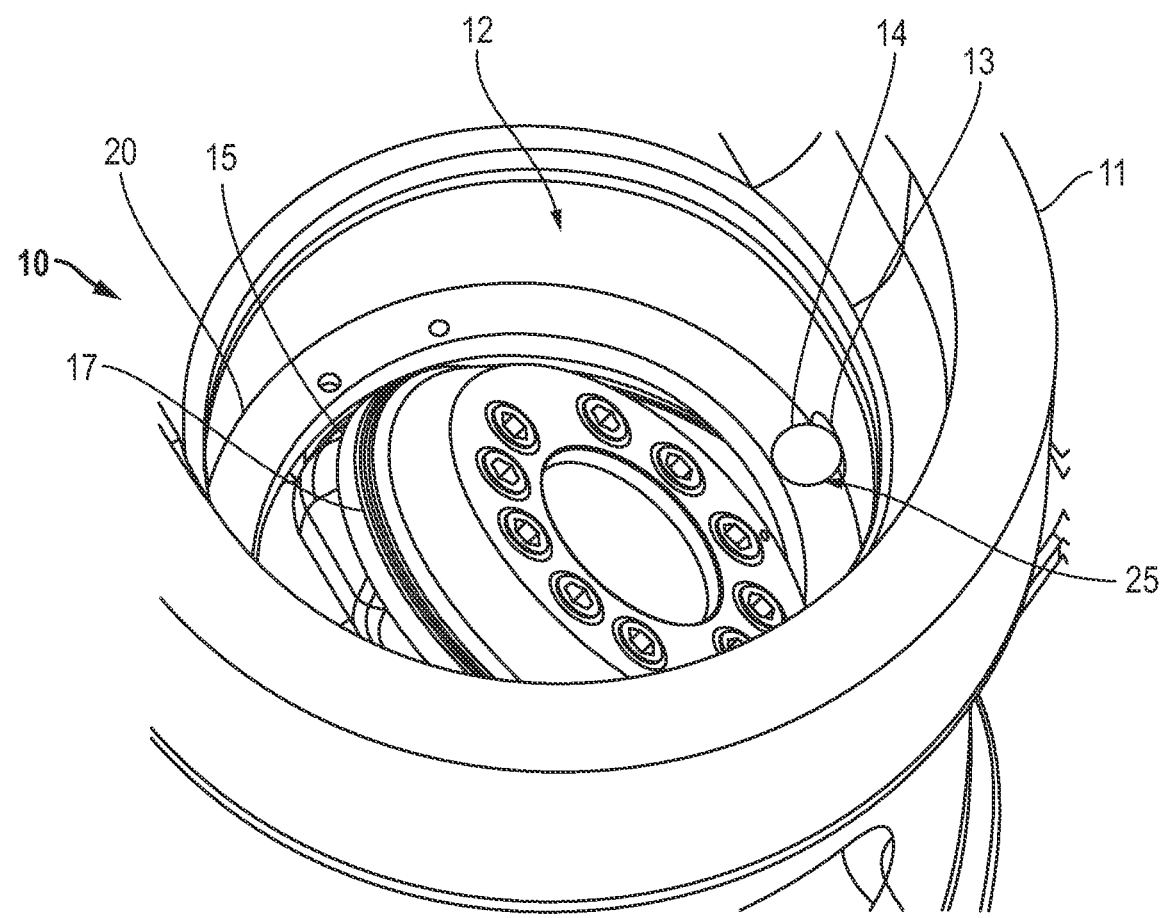
FIG. 5 depicts a partial isometric view of an exemplary embodiment of a butterfly valve and a seat of an improved seat retention arrangement.

As can be seen in FIG. 5, the seat 20 and seat gasket 22 are installed or placed through the hatch 12 onto the valve body 11, wherein the seat gasket 22 rests against the valve body 11. The valve body 11 defines a valve body notch 13 which corresponds and aligns with a seat notch 25 when the seat 20 is in the correct assembled position. The seat alignment button 14 can then be placed or installed through the hatch 12 into both of the valve body notch 13 and seat notch 25 to ensure that the seat 20 stays aligned with the valve body 11.

Figure 6:
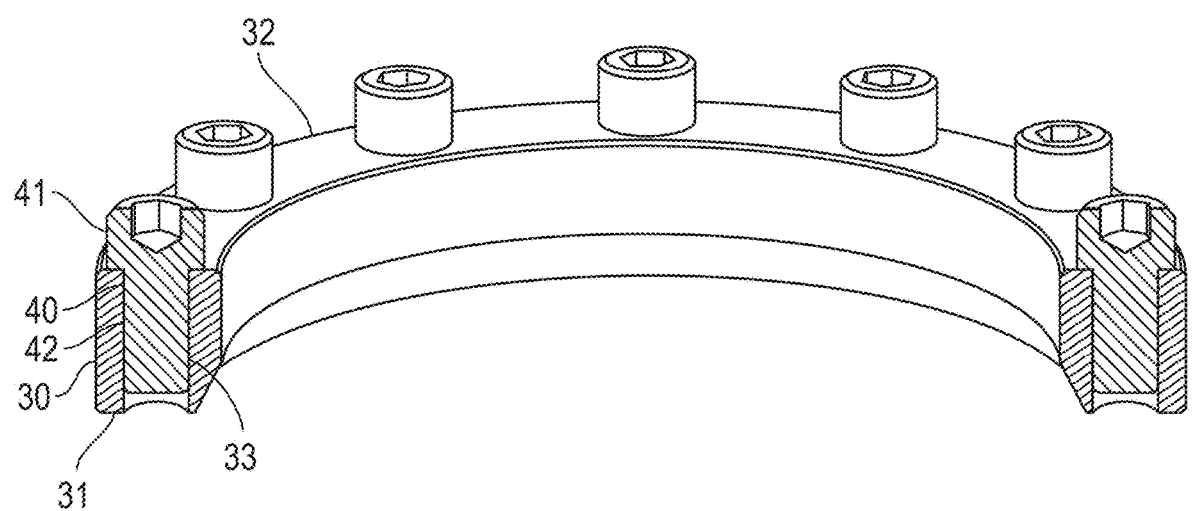
FIG. 6 depicts a cross-sectional view of exemplary embodiments of a seat spacer and cap screws for an improved seat retention arrangement.
Figure 7:
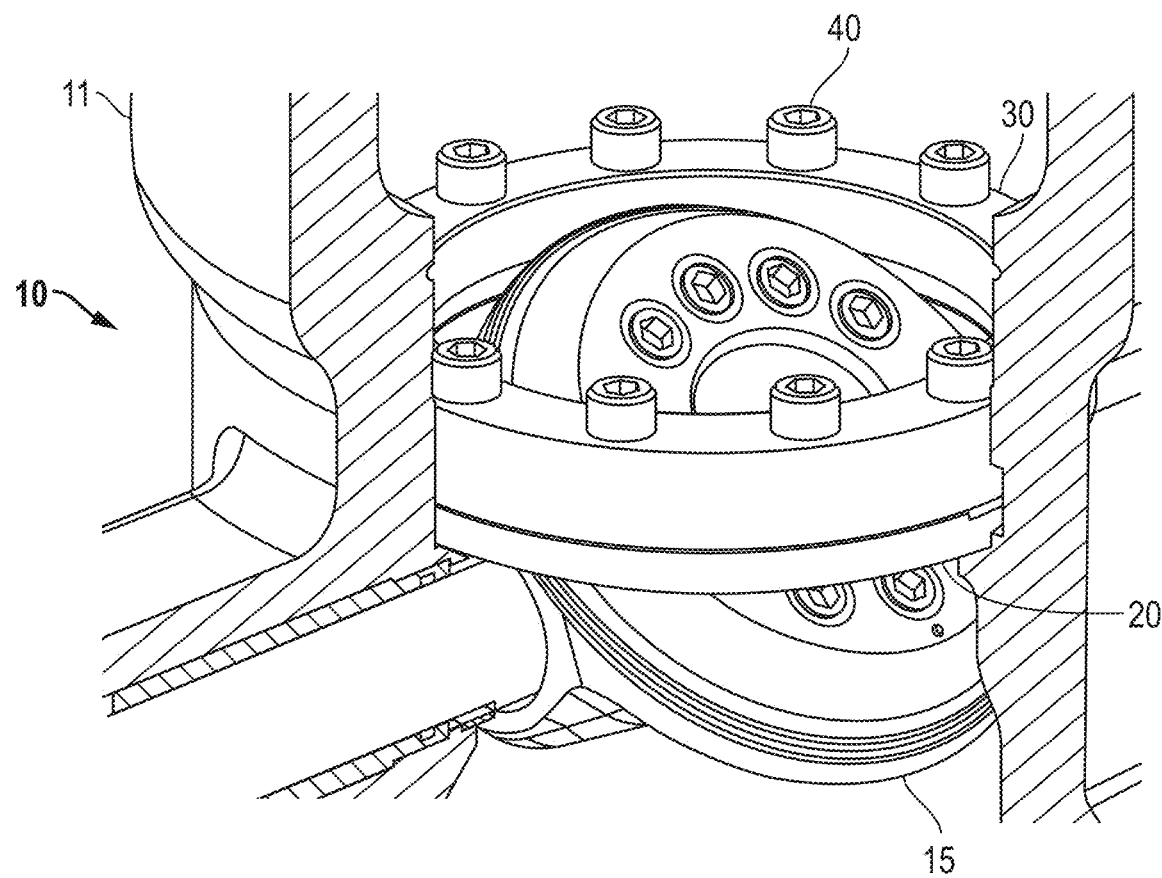
FIG. 7 depicts a partial isometric view, with part of the valve body removed in the view, of exemplary embodiments of a seat, a seat spacer and cap screws of an improved seat retention arrangement in a butterfly valve.

The second surface 24 of the seat 20 is adjacent to a first surface or side 31 of the seat spacer 30 when in the assembled improved seat retention arrangement 70, as can be seen in FIGS. 1-3 and 7-10. FIG. 6 depicts an enlarged cross-sectional isometric view of the seat spacer 30. The seat spacer 30 further defines a second surface or side 32 of the seat spacer 30, located across from the first side 31 of the seat spacer 30. A number of holes or bores 33 open through the first surface 31 and second surface 32 of the seat spacer 30 (although in alternative exemplary embodiments, the bore 33 does not necessarily extend through to the first surface 31, but is open to the second surface 32). A cap screw or other movable fastener 40 is inserted into each bore 33, through the second surface 32. The cap screws or movable fasteners 40 include a head or top 41 and a shaft 42, wherein the shaft 42 is threaded and engaged with the hole or bore 33, and the head or top 41 is located above the second surface 32 of the seat spacer 30. The head 41 may contain a set of cavities or protrusions that allow a wrench, hex key, ratchet, screwdriver, or any other suitable handle or rotating tool with a mating set of cavities or protrusions to transfer rotational motion to the threaded shaft portion 42 which then moves the cap screw 40 into and out of, or towards and away from, the second surface 32, depending on the direction of rotation. In certain exemplary embodiments, the cap screws 40 are socket head cap screws, although other types of fasteners 40 may be used as is known to one of ordinary skill in the art. In particular, socket head cap screws 40 may be preferred in certain exemplary embodiments as they allow for higher torque application compared to other fasteners 40; socket head cap screws 40 may provide a stronger hex socket. As can be seen in FIG. 7, after assembling the seat 20 in FIG. 5, the seat spacer 30 is placed into the valve body 11, wherein the first surface 31 of the seat spacer 30 is adjacent to the second surface 24 of the seat 20, and wherein the cap screws 40 and the second surface 32 of the seat spacer 30 are facing upward.

Figure 8:
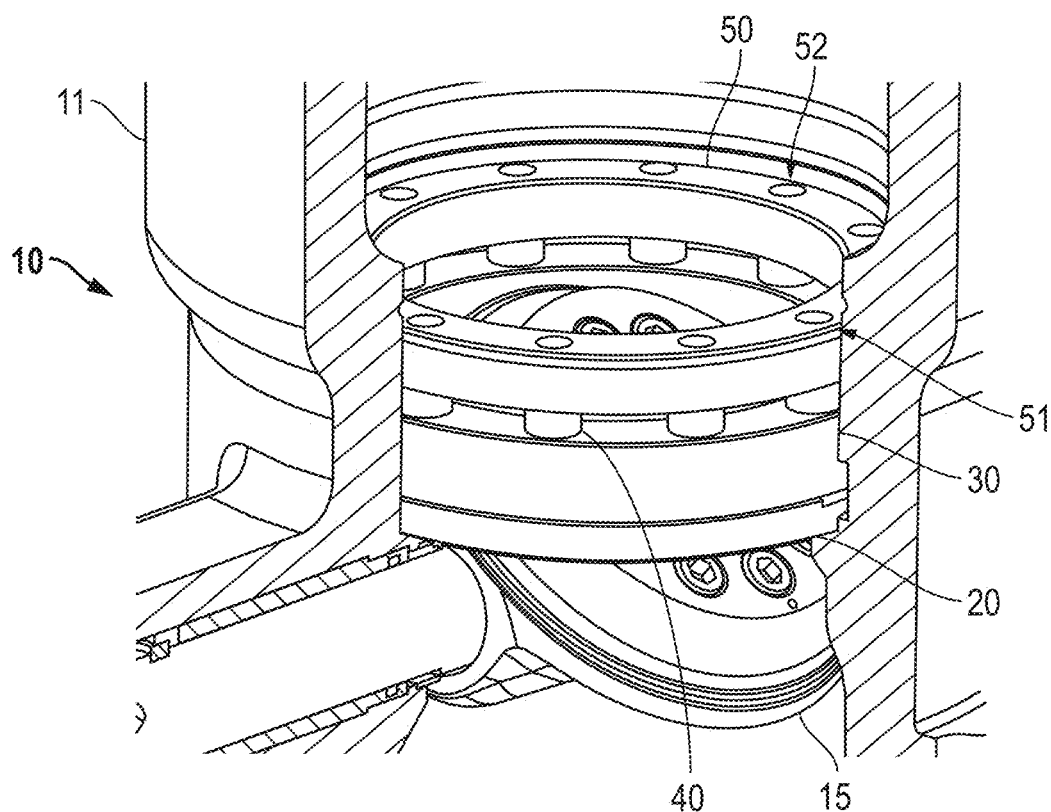
FIG. 8 depicts a partial isometric view, with part of the valve body removed in the view, of exemplary embodiments of a seat, a seat spacer, cap screws and a seat retainer of an improved seat retention arrangement in a butterfly valve.
Figure 9:
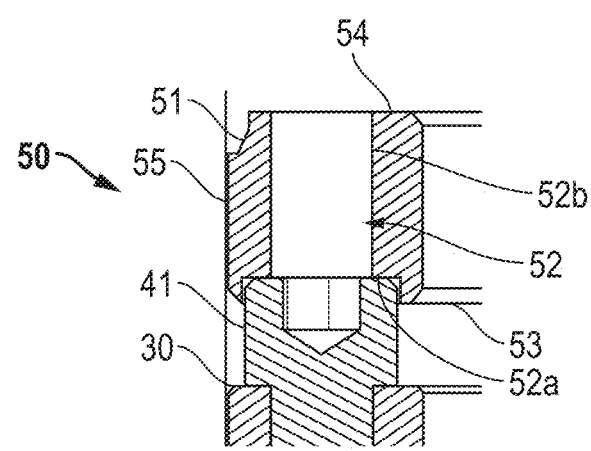
FIG. 9 depicts an enlarged cross-sectional view of exemplary embodiments of a seat spacer, cap screws and a seat retainer of an improved seat retention arrangement.

Subsequently, and referring further to FIGS. 8-9, the seat retainer 50 is placed, located, or installed into the valve body 11 above or adjacent to the cap screws 40. The seat retainer 50 also defines a first surface or side 53 and a second surface or side 54 which is across from the first surface or side 53. The seat retainer 50 includes a number of counter bores, openings, or holes 52 defined through the first surface 53 and second surface 54. Each counter bore, opening, or hole 52 has or connects a wider diameter 52*a* opening near the first side 53 and a narrower diameter 52*b* opening near the second side 54. The wider diameter 52*a* of the counter bore 52 may have a substantially complementary fit to the head 41 of the cap screws 40. The narrower diameter 52*b* of each counter bore 52 is narrower than the width or diameter of each cap screw head or top 41, but wide enough to allow access to any socket, protrusions or cavities defined on the cap screw head 41 for a wrench, hex key, ratchet, screwdriver, or other tool to access. Thus, when the improved seat retention arrangement 70 is assembled, each head 41 of the cap screws 40 are placed or inserted into the wider diameter 52a opening of the counter bore 52, and the narrower diameter 52b prevents loss of any cap screws 40 through the second side 54 of the seat retainer 50. The wider diameter 52 may fit complementary to the top or head 41 of the cap screws or fasteners 40. When inserting the seat retainer 50 into the valve body 11, the operator should ensure that each of the larger ends 52a of the counter bores 52 engages and rests on a corresponding cap screw head 41.

Figure 10:
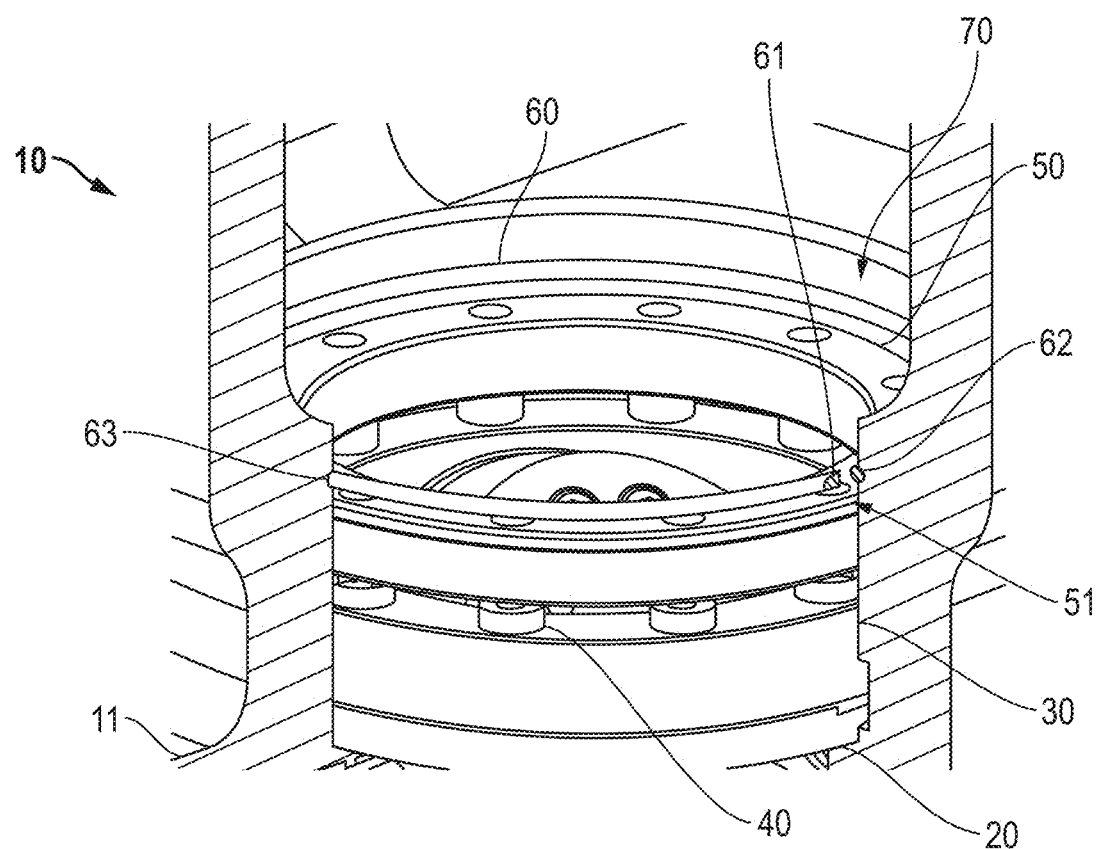
FIG. 10 depicts a partial isometric view, with part of the valve body removed in the view, of exemplary embodiments of a seat, a seat spacer, cap screws, a seat retainer and a seat retaining ring of an improved seat retention arrangement in a butterfly valve.
Figure 11:
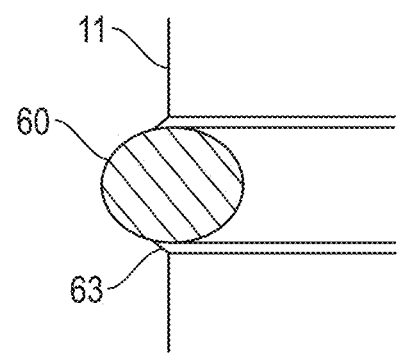
FIG. 11 depicts an enlarged cross-sectional view of an exemplary embodiment of a seat retainer ring of an improved seat retention arrangement in a butterfly valve body.

The seat retainer 50 also defines a seat retainer taper, bevel, or slope surface 51 connecting the second surface 54 and an exterior wall 55 of the seat retainer 50, wherein the seat retaining ring 60 rests when properly assembled into the seat retention arrangement 70. As can be seen in FIGS. 10-11, the seat retaining ring 60 may be an open or broken ring having a flat or first end 61 and a second end 62.

The valve body 11 defines a groove or slot 63 into which the seat retaining ring 60 is installed. The flat end 61 of the seat retaining ring 60 is first inserted into the valve body groove or slot 63; the seat retaining ring 60 is along the retaining ring's 60 circumference until the second end 62 also snaps into place within the valve body groove or slot 63.

To finish the assembly and installation, each of the heads 41 of the cap screws 40 are rotated in a direction to extend out of the seat spacer 30, or loosened out of the seat spacer 30. In certain exemplary embodiments, this may be in a counterclockwise rotational direction. The extension of the cap screws 40 out of the seat spacer 30 also extends or moves the seat retainer 50 and the seat retainer taper 51, towards the seat retaining ring 60 which is snapped into the body groove 63. The cap screws 40 may be turned or rotated in a cross-pattern sequence until the seat retainer taper face 51 rests or engages against the seat retaining ring 60 in the body groove or slot 63. The cap screws 40 should continue to be extended out of the seat spacer 30 until the seat retainer 50 is sufficiently clamped, engaged or pressed against the seat retaining ring 60 as desired by the operator. The seat retaining ring 60 is biasable or pliable and hence the biasing force of the seat retaining ring 60 is translated via the seat retainer 50, next the cap screw(s) 40, and then the seat spacer 30 to secure, clamp, or retain the seat 20 in place within the body 11. Hence, the biasing force is enabled by rotating the caps screw(s) 40 counterclockwise to force the seat retainer 50 against the seat retaining ring 60. In certain exemplary embodiments, the seat retaining ring 60 may be made of stainless steel material.

In the improved seat retention arrangement 70, positive locking or retention of the seat 20 is achieved by at least two factors, including thread tension and the head bearing surface contact, and the seat retainer 50 and seat 20 are clamped or retained by loosening or extending the cap screws 40 via rotating in a counterclockwise direction. The thread tension refers to the thread of the cap screw shaft 42 within the bores 33 of the seat spacer 30. The head bearing surface contact refers to the cap screw head 41 bearing against the counter bore 52; in certain exemplary embodiments, the cap screw head 41 bears against the wider or larger diameter end 52a of the counter bore 52. In conventional seat retention arrangements, positive locking of the seat is generally only achieved by one factor—such as jam nuts, or top set screws, and the seat retainer is clamped only by tightening the bolts or screws in a clockwise direction. Thus, rotating the cap screws 40 via rotating in a counterclockwise direction to secure, clamp, or retain the seat 20 is counterintuitive in the valve body 11 environment as defined. The cap screws 40 of the improved seat retention arrangement 70 are also capable of being lowered as a set with the seat spacer 30—thus there is minimal to no possibility of the cap screws 40 falling out by accident. In comparison, the conventional seat retention arrangements tend to use many small screws which are prone to being lost during assembly; these small screws are individually placed onto the valve and are easily misplaced. The cap screws 40 of the improved seat retention arrangement 70 can be adjusted independently to properly compress the gasket 22; there is no need to remove additional components—as in the case of using set screws or screws with jam nut.

While the embodiments are described with reference to various implementations and exploitations, it will be understood that these embodiments are illustrative and that the scope of the inventive subject matter is not limited to them. Many variations, modifications, additions, and improvements are possible. The teachings and disclosure of International Publication WO2011/143598 A2 entitled "Valve assembly and method of using same" is hereby incorporated by reference.

Plural instances may be provided for components, operations or structures described herein as a single instance. These and other variations, modifications, additions, and improvements may fall within the scope of the inventive subject matter.

The invention claimed is:

1. A retention arrangement for a seat in a valve body, wherein the seat has a first seat side and a second seat side, comprising:
    a seat spacer wherein the seat spacer has a first seat spacer side and a second seat spacer side, wherein the seat spacer is adjacent to the seat;
    a fastener inserted into the second seat spacer side, wherein the fastener includes a head above the second seat spacer side, and further wherein the head is movable towards and away from the second seat spacer side; and
    a seat retainer adjacent to the head of the fastener, wherein the seat retainer has a first seat retainer side and a second seat retainer side;
    wherein the seat retainer defines a counter bore through first seat retainer side and the second seat retainer side, and further wherein the counter bore is complementary to the head of the fastener;
    wherein the head of the fastener is configured to extend out of the second seat spacer side when the fastener is rotated in a counterclockwise direction and the head of the fastener exerts increased force against the seat retainer when increasingly extended.

2. The retention arrangement of claim 1, wherein the seat retainer defines a tapered surface connecting the second seat retainer side to an exterior wall of the seat retainer.

3. The retention arrangement of claim 2, further comprising a seat retaining ring adjacent to the tapered surface of the seat retainer.

4. The retention arrangement of claim 1, wherein the fastener is a socket head cap screw.

5. A method for retaining a seat in a valve body, wherein the seat has a first seat side adjacent to the valve body and a second seat side, comprising the steps of:
    placing a seat spacer adjacent to the seat and in the valve body, wherein the seat spacer has a first seat spacer side and a second seat spacer side;
    wherein the seat spacer includes a movable fastener;
    placing a seat retainer adjacent to the second seat spacer side and in the valve body;
    placing a seat retaining ring in a groove defined in the valve body;

extending the movable fastener out of the second seat spacer side and thus moving against the seat retainer towards the seat retaining ring;

further comprising the step of clamping the seat retainer against the seat retaining ring as a result of the step of extending the moveable fastener.

6. The method of claim 5, wherein the step of extending the movable fastener comprises the step of rotating the movable fastener in a counterclockwise direction.

7. The method of claim 6, wherein the movable fastener comprises a plurality of movable fasteners, and the step of placing the seat spacer adjacent to the seat and in the valve body also comprises the step of lowering all of the plurality of movable fasteners simultaneously into the valve body.

8. The method of claim 7 wherein the step of extending the movable fastener comprises extending the plurality of movable fasteners in a cross-pattern sequence.

9. The method of claim 8, wherein the plurality of movable fasteners comprise a plurality of socket head cap screws.

10. The method of claim 5, further comprising the step of locking the seat into the valve body via thread tension and the movable fastener bearing surface contact against the seat retainer.

11. The method of claim 10, wherein the seat retainer defines a counter bore, and further comprising the step of placing the counter bore adjacent to a top of the movable fastener.

12. A valve with an improved retention arrangement for a seat, wherein the seat has a first seat surface and a second seat surface, comprising:
 a valve body defining a through-bore, and wherein the first seat surface is positioned adjacent to the valve body in the through-bore;
 a seat spacer having a first seat spacer surface and a second seat spacer surface, wherein the first seat spacer surface is adjacent to the second seat surface;
 a fastener threadably inserted into the second seat spacer surface, wherein a top of the fastener is movable towards and away from the second seat spacer surface;
 a seat retainer adjacent to the top of the fastener, wherein the seat retainer has a first seat retainer surface and a second seat retainer surface; and
 a seat retaining ring inserted into a groove defined in the through-bore of the valve body;

further comprising a counter bore defined through first seat retainer surface and the second seat retainer surface, wherein the counter bore is complementary to the top of the fastener;

further comprising a first notch defined on the valve body; a second notch defined on the seat; and the alignment button inserted into both the first notch and the second notch;

further comprising a wide end of the counter bore complementary to the top of the fastener; and a narrow end of the counter bore, wherein the narrow end of the counter bore has a smaller diameter than the top of the fastener;

wherein the fastener comprises a socket head cap screw;

wherein the seat retainer defines a sloped surface connecting the second seat retainer surface to an exterior wall of the seat retainer; and wherein the seat retaining ring abuts the sloped surface;

wherein the socket head cap screw is configured to increase a clamping force on the seat retainer and seat retaining ring as the top is moved away from the second seat spacer surface.

13. A method for retaining the seat in the valve body of the valve according to claim 12, comprising the steps of:
 rotating the socket head cap screw in the seat spacer in a counterclockwise direction, wherein the seat spacer is adjacent to the seat;
 forcing the seat retainer adjacent to the socket head cap screw against the seat retaining ring, wherein the seat retaining ring is biasable;
 forcing or translating a force of the seat retaining ring to the seat retainer;
 forcing or translating the said force to the socket head cap screw, and
 forcing or translating the said force to the seat spacer for securing the seat in place within the valve body.

* * * * *